INVENTOR.
JOHN H. SASSEEN
BY John B Davidson
ATTORNEY

INVENTOR.
JOHN H. SASSEEN
BY John B Davidson
ATTORNEY

United States Patent Office 3,664,610
Patented May 23, 1972

3,664,610
AUTOMATIC SYSTEM FOR LIFTING MAGNETIC TAPE FROM MAGNETIC HEADS

John H. Sasseen, Houston, Tex., assignor to Esso Production Research Company

Filed July 6, 1970, Ser. No. 52,355
Int. Cl. B65h *75/34;* G03b *1/04;* G11b *15/60*
U.S. Cl. 242—210 3 Claims

ABSTRACT OF THE DISCLOSURE

Magnetic tape transport apparatus for use with digital computers and recorders use tape tension control devices in conjunction with the speed control mechanism controlling speed and direction of the tape transfer between a storage reel and a "take-up" reel. The wear rate of the magnetic head used for recording and/or reproducing data signals is minimized by directing a stream of compressed air between the head and the tape.

BACKGROUND OF THE INVENTION

This invention relates to apparatus for recording data on magnetic tape and more particularly to a system for minimizing wear of magnetic recording heads during high speed rewind of recording tape on a reel.

The use of magnetic tape has become quite conventional for storing data, particularly digital data which is to be used for various purposes in a digital computer. When the data is being recorded or read off of the magnetic tape for computational purposes, it is customary to record or reproduce the data at a relatively slow tape speed (for example, 45 inches per second) and to rewind the tape on a storage reel at a relatively high speed (for example, 180 inches per second). It is also customary to vary the speed of the storage reel and the "take-up" reel so as to regulate the tension in the tape as it passes over the magnetic head used for recording or reproducing the data. Regulation of such tension is necessary for a number of reasons, the most important of which is to prevent the tape from jumping out of the various guide grooves, retainers, and rollers through which it passes while going from one reel to the other. Generally speaking, the tension in the tape must be increased as the tape speed is increased. It can be readily appreciated that should the tape jump out of such grooves, retainers, and rollers, it will become badly snarled and will temporarily stop operation of the computer. Since digital computers are extremely expensive to operate, snarling must be prevented.

It has been found that, as a result of the tension requirements, magnetic heads wear badly during the rewind cycle of operation during which the tape is passed over the recording head at a very high velocity. In a specific example, magnetic recording heads used in connection with digital processing of seismic information normally can be used only four to six weeks before requiring replacement. Since the heads cost in excess of $1,500 each it is manifest that there is considerable economic incentive to minimizing head wear.

In accordance with the teachings of the present invention, compressed air is directed underneath a recording tape and over a magnetic head in a direction opposite to the direction of travel of the magnetic tape during rewind thereof on a storage reel. Preferably, air is ejected from a nozzle having an exit opening substantially the width of the magnetic tape to direct a stream of compressed air at the underside of the magnetic tape at its point of juncture with the recording head just after it has passed over the entirety of the recording head. The tape is thus lifted off of the recording head by the moving stream of air a distance between 6 and 15 microns which is insufficient to cause the tape to leave its guide members but sufficient to prevent contact with the recording face of the magnetic head.

Objects and features of the invention not apparent from the above discussion will become evident upon consideration of the following detailed description of the invention when taken in connection with the accompanying drawings which illustrate an embodiment of the invention, and which are to be taken in an illustrative sense and not by way of limitation or restriction.

DETAILED DESCRIPTION OF THE PREFERRED EMBODIMENT

Figure 1:
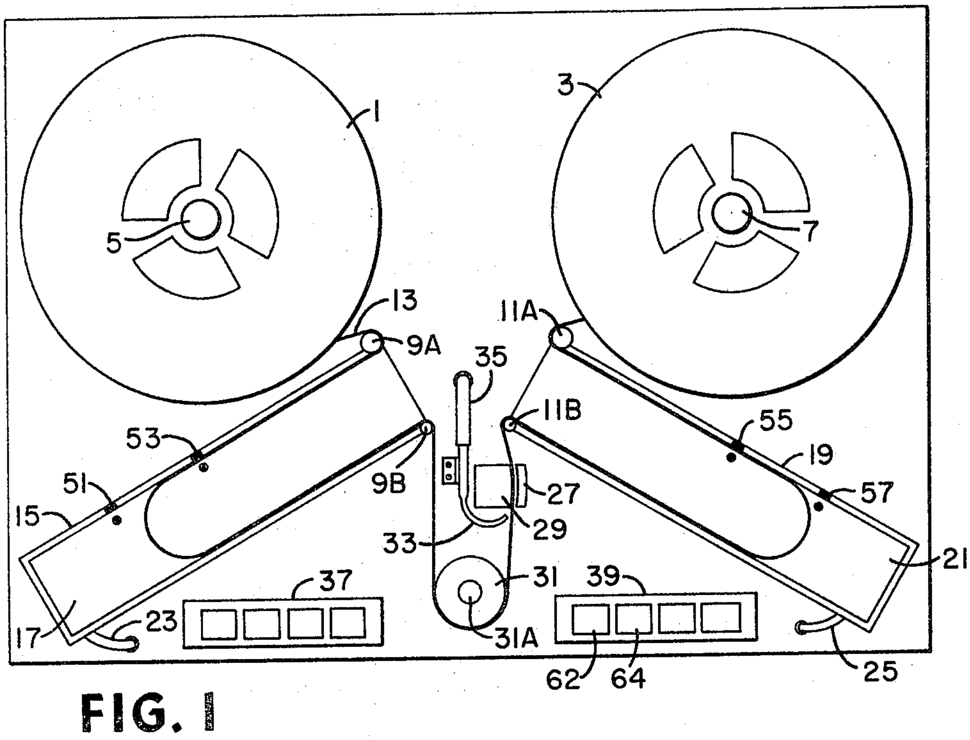
FIG. 1 is a top view of a portion of a recording mechanism making use of the invention.

With reference now to FIG. 1, there is illustrated a top view of a conventional recording apparatus utilizing magnetic tape such as is commonly used on a number of different types of digital computers. The specific recording device illustrated in FIG. 1 may be a device such as manufactured by the Ampex Corporation of Los Angeles, Calif., and designated by them Model TM7291. The device makes use of a storage reel 1 detachably connected to a drive shaft 5 and on which many hundreds of feet of recording tape may be wound and stored. Drive shaft 5 is driven by an electrical motor the speed of which preferably is dependent upon the voltage applied thereto, or to the field windings thereof, whichever may be more convenient. There is also illustrated a take-up reel 3 driven from a drive shaft 7, also by an electrical motor the speed of which is proportional to the voltage applied to either the main winding or the field winding thereof. Electrical data signals are either recorded on or reproduced from the magnetic tape 13 by means of a recording head 29 having a retainer 27 spaced therefrom so as to leave a narrow gap therebetween through which the recording tape 13 may pass. Small retainer projections (not shown) may be included on either side of the recording head to insure that the magnetic tape 13 passes cleanly thereacross. There is also provided a pair of vacuum chambers 15 and 19 for the purpose of providing a certain amount of slack in the tape before and after it passes over the recording head 29 and also for the purpose of providing a control for adjusting the tension in the magnetic tape. Guide rollers 9A and 9B are provided at the mouth of the vacuum chamber 15 and guide rollers 11A and 11B are provided at the mouth of vacuum chamber 21. Vacuum lines 23 and 25 are respectively connected to the lower end of the vacuum chambers 15 and 19 and lead to a blower or vacuum pump 81 (see FIG. 4B) driven by an electrical motor for the purpose of withdrawing air from the chambers 15 and 19. While in transit from storage reel 1 to take-up reel 3, the tape 13 passes over guide roller 9A and extends into the vacuum chamber 15, then passes over guide roller 9B, around idler wheel 31, and over magnetic head 29. Thereafter the tape passes over guide roller 11B into chamber 21 and over guide roller 11A before being wound on the take-up reel 3. The vacuum in the chambers 15 and 19 pulls the tape against the side of the vacuum chambers 15 and 19 to maintain the vacuum in the lower ends 17 and 21 of the vacuum chambers. Thus the tape slides along the sides of the vacuum chambers and makes a loop therein the length of which is variable depending upon the tension in the tape and the speed of the reels 1 and 3. To detect the position of the tape in the vacuum chambers, there are provided pairs of electrical contact detectors 51 and 53 in chamber 15 and detectors 55 and 57 in chamber 19. The pairs of detectors are spaced apart along the length of their respective vacuum chambers and may each consist of pairs of electrical contacts spaced so that an electrical circuit therebetween is completed by the magnetic tape. As will be described below, contact detector members 51, 53, 55, and 57 are for the purpose of regulating the speed of the electrical motors driving the reels 1 and 3.

There is also provided a pair of control button assemblies for the purpose of controlling the direction of movement of the tape and the mode of operation (recording or reproduction) of the recording head as well as other desired control conditions that may be appropriate.

Figure 4A:
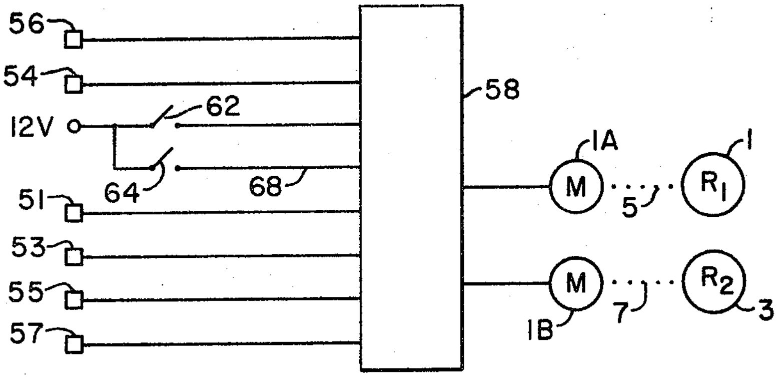
FIGS. 4A and 4B are electrical schematic diagrams illustrating electrical control apparatus for a recording mechanism utilizing the invention.

The idler wheel 31 preferably drives a speed sensor 54 (see FIG. 4A) for producing an output voltage proportional to the speed of rotation of the idler wheel 31 and thus the linear speed of the tape 13.

Figure 4B:
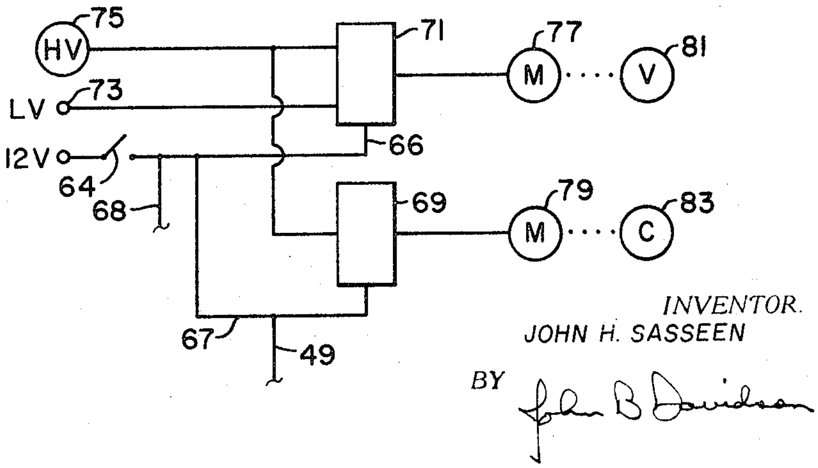

With reference now to FIG. 4B, there is illustrated in schematic form an electrical circuit for controlling the speed of electrical motors 1A and 1B that drive the storage reel 1 and the take-up reel 3 through drive shafts 5 and 7. The voltage applied to either the main winding or to the field of the motors 1A and 1B is controlled through a servo circuit 58 in accordance with electrical signals received from sensors 51, 53, 54, 55, 56, and 57. The servo circuit 58 thus adjusts the tape position in the vacuum chambers 15 and 19, the linear speed of the idler wheel 31 indicated by sensor 54, and the tension in the tape indicated by sensor 56 attached to guide roller 11B, and adjusts the speed of the two motors 1A and 1B in accordance with the signal received thereby to maintain the entire tape control system in balance.

All of the apparatus described above is entirely conventional in the art and is utilized in the aforementioned tape recording mechanism manufactured by the Ampex Corporation, Model TM7291.

Figure 2:
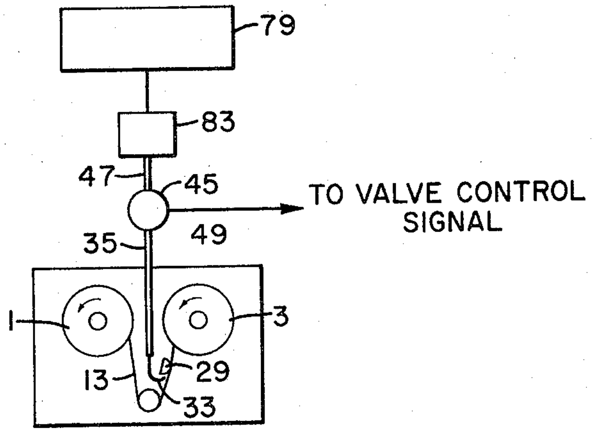
FIG. 2 is a schematic diagram of a recording mechanism and associated apparatus for using the invention.
Figure 3:
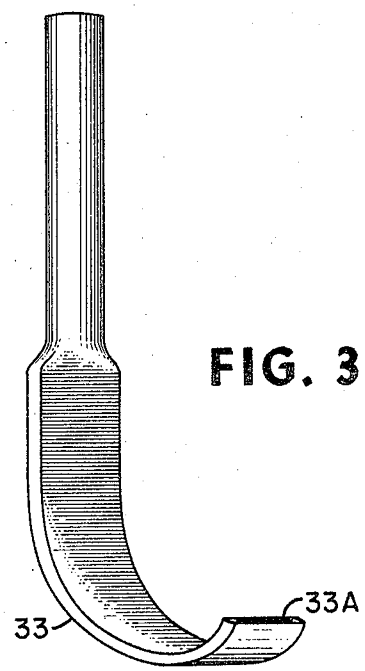
FIG. 3 is a perspective view of nozzle 33 of FIG. 1.

Referring again to FIGS. 1 and 3, a small arcuate nozzle 33 is illustrated, the opening 33A of which is positioned to direct a stream of compressed air at the underside of the magnetic tape 13 that contacts the magnetic head 29. The stream of compressed air is directed at the tape so that the air is moving in a direction opposite to the direction of movement of the tape during the rewind cycle when it is passing from pickup reel 3 to storage reel 1 (as better illustrated in FIG. 2). The nozzle 33 is connected to a compressor 83 through control valve 45, and the compressor 83 is driven by electrical motor 79. The valve member 45 is opened by an electrical signal applied to lead 49 which is energized simultaneously with energization of motor 79 as will be described below in connection with FIG. 4B.

The width of the opening 33A from the nozzle 33 preferably should be approximately the width of the tape 13 so as to produce a blast of air that will most effectively lift the tape off of the recording head 29 as will be described below.

With reference now to FIG. 4B there is illustrated in schematic form the motor 77 and 79 for driving a vacuum pump 81 and air compressor 83. The speed of motor 77 and thus the vacuum produced by vacuum pump 81 is varied by applying either a high voltage from terminal 75 or a low voltage from terminal 73 to the main windings of motor 77 through a relay 71. Normally, the low voltage terminal 73 is applied to the winding, and the high voltage terminal 75 is switched into electrical connection therewith by applying a twelve volt actuating signal through lead 66 upon closure of switch 64 (this is the same switch that applies voltage for increasing the speed of motors 1A and 1B on the rewind cycle of the recording mechanism). The windings of motor 79 are energized from the high voltage terminal 75 through a relay 69 by concomitantly energizing lead 67 with the energization of lead 66. In the normal position of switch 69 no voltage is applied to the compressor 79. Simultaneously, a voltage is supplied to lead 49 (see also FIG. 2) for actuating the control valve that connects the compressor 83 to the nozzle 33.

The operation of the apparatus described above will now be described. Initially switch 62 is energized to apply a signal to the servo circuit which will electrically energize the motors 1A and 1B and motor 77. Initially motor 77 is energized by applying a relatively low voltage thereto. When the motors come up to speed the recording head 29 can be energized to record data thereon. The speed of the tape will be regulated along with the tension in tape across the recording head in accordance with the signals applied to the servo circuit 58 from sensors 51, 53, 54, 55, 56, and 57. The vacuum in the lower ends 17 and 21 of the vacuum chambers and the signals from sensors 51, 53, 55, and 57 will determine the loop positions of the tape in the vacuum chambers which aids the tension sensor affixed to roller member 11B in maintaining constant tension in the system. Thus the effect of the inevitable hunting action in the electrical motors on the tension in the tape will be minimized. At the end of a recording or reproduction cycle switch 62 is opened and switch 64 is closed. This will cause the servo circuit 58 to reverse the direction of rotation of the motors 1A and 1B and to apply higher voltage thereto so that they will greatly increase the tape speed, preferably to at least four times the speed of the tape on the recording and reproduction cycle thereof. Simultaneously relay 71 is energized so that a higher voltage is applied to motor 77 thus producing a higher vacuum in the lower ends 17 and 21 of the vacuum chambers to keep the end of the loop between the sensors 51, 53, 55, and 57. Simultaneously valve 45 is opened and motor 79 is energized to drive the compressor 83. A blast of air from the nozzle 33 is directed at the underside of the tape to lift the tape off of the recording head 29 a distance of between 6 and 15 microns. In effect, the tape 13 is floating on a moving current of air as it passes over recording head 59. At the end of the rewind cycle switch 64 is opened to return the system to a quiescent condition.

It has been found that the invention reduces the wear of magnetic recording and reproducing heads to less than ⅓ of the wear experienced without the use of the invention. In one specific case, a machine where recording and reproducing head lifetime never exceeded six weeks has now been used over four months and does not show appreciable wear. It is estimated that at least six months use will be obtained from the head without the necessity of replacing the head.

What is claimed is:

1. In a recording system wherein a magnetic tape wound on a reel is moved across an electromagnetic head for recordation or reproduction of an electrical signal, and wherein the magnetic tape is rewound on the reel at a speed greater than the recording speed, the improvement comprising:

means directing a stream of compressed air between the tape and the head to flow in a direction opposite to the direction of movement of the tape during rewinding cycles thereof, said means being operable only while the tape is being rewound on the wheel.

2. The apparatus of claim 1 wherein the means for directing a stream of compressed air comprising a nozzle, an air compressor connected to the nozzle, said nozzle being positioned to direct the air exiting therefrom between the tape and the head, and means for activating the air compressor only while the tape is being rewound on the reel.

3. The apparatus of claim 2 wherein the exit opening of the nozzle has a width equal substantially to the width of the tape.

References Cited

UNITED STATES PATENTS

| | | | |
|---|---|---|---|
| 3,416,149 | 12/1968 | Stahler | 340—174.1 E |
| 3,170,045 | 2/1965 | Baumeister | 179—100.2 P |
| 3,435,442 | 3/1969 | Ma et al. | 340—174.1 E |

LEONARD D. CHRISTIAN, Primary Examiner

U.S. Cl. X.R.

226—95